(12) United States Patent
Anderson, Jr. et al.

(10) Patent No.: US 10,675,914 B2
(45) Date of Patent: Jun. 9, 2020

(54) TIRE CHAINS APPARATUS

(71) Applicant: Dusawn Holdings LLC, Aurora, CO (US)

(72) Inventors: Charles Edward Anderson, Jr., Aurora, CO (US); Kristine Janelle Im, Mead, CO (US)

(73) Assignee: Dusawn Holdings LLC, Aurora, CO (US)

( * ) Notice: Subject to any disclaimer, the term of this patent is extended or adjusted under 35 U.S.C. 154(b) by 166 days.

(21) Appl. No.: 15/847,911

(22) Filed: Dec. 20, 2017

(65) Prior Publication Data

US 2019/0184743 A1    Jun. 20, 2019

(51) Int. Cl.
*B60B 39/00* (2006.01)

(52) U.S. Cl.
CPC ...... *B60B 39/003* (2013.01); *B60B 2900/551* (2013.01); *B60B 2900/721* (2013.01)

(58) Field of Classification Search
CPC .............. B60B 39/003; B60B 39/006; B60B 2900/551; B60B 2900/721
See application file for complete search history.

(56) References Cited

U.S. PATENT DOCUMENTS

| | | | | |
|---|---|---|---|---|
| 1,045,609 A * | 11/1912 | Putnam | ........... | B60B 39/003 188/4 B |
| 2,140,606 A * | 12/1938 | Stickles | ........... | B60B 39/003 188/4 B |
| 2,241,923 A * | 5/1941 | Ridgway | ........... | B60B 39/003 188/4 B |
| 2,277,036 A * | 3/1942 | Chaussee | ........... | B60B 39/003 188/4 B |
| 2,543,876 A * | 3/1951 | Smith | ........... | B60B 39/003 91/210 |
| 2,815,828 A * | 12/1957 | Schaefer | ........... | B60B 39/003 188/4 B |
| 2,865,471 A * | 12/1958 | Chaussee | ........... | B60B 39/003 188/4 B |
| 3,068,949 A * | 12/1962 | Sirois | ........... | B60B 39/003 180/313 |
| 4,054,304 A * | 10/1977 | Sirois | ........... | B60B 39/003 280/757 |

(Continued)

FOREIGN PATENT DOCUMENTS

WO    01/15947    3/2001

*Primary Examiner* — Michael McCullough
(74) *Attorney, Agent, or Firm* — Trenner Law Firm, LLC; Mark D. Trenner (57) ABSTRACT

Provided is an apparatus designed to engage tire chains on motorized vehicles when hazardous road conditions are present, including snow or ice. Moreover, the chains are designed to be deployed manually from inoperative to operative positioning by raising and lowering the apparatus handle. A rotating quick deploy chain wheel at the bottom of the apparatus throws a plurality of chains between the tire and road surface generating vehicle traction. This utility patent for tire chains will provide a cost effective, simple method for putting on and taking off snow tire chains. Existing automatic chain systems characteristically require electronics, motors or a pneumatic system. The embodiment of this apparatus is the simplicity of locking a handle and the chains are engaged. Releasing the handle and the chains are disengaged.

7 Claims, 9 Drawing Sheets

(56) References Cited

U.S. PATENT DOCUMENTS

| | | | | |
|---|---|---|---|---|
| 4,299,310 A * | 11/1981 | Torneback | B60B 39/003 | 152/208 |
| 4,621,712 A * | 11/1986 | Hardmark | B60B 39/003 | 152/208 |
| 4,657,118 A * | 4/1987 | Andersson | B60B 39/003 | 152/208 |
| 4,745,993 A * | 5/1988 | Schulz | B60B 39/003 | 152/208 |
| 4,751,975 A * | 6/1988 | Rieger | B60B 39/003 | 152/222 |
| 4,800,939 A * | 1/1989 | Torneback | B60B 39/006 | 152/214 |
| 4,800,992 A * | 1/1989 | Andersson | B60B 39/006 | 152/208 |
| 4,840,399 A * | 6/1989 | Rieger | B60B 39/003 | 152/208 |
| 4,901,809 A * | 2/1990 | Tschannen | B60B 39/003 | 180/16 |
| 5,048,646 A * | 9/1991 | Carlsson | B60B 39/003 | 152/208 |
| 5,076,379 A * | 12/1991 | Bahr | B60B 39/006 | 180/16 |
| 5,080,443 A * | 1/1992 | Torneback | B60B 39/003 | 188/4 B |
| 5,332,015 A * | 7/1994 | Zeiser | B60B 39/006 | 152/215 |
| 5,377,735 A * | 1/1995 | Zeiser | B60B 39/003 | 152/208 |
| 5,386,888 A * | 2/1995 | Hofmann | B60B 39/006 | 188/4 B |
| 5,785,351 A * | 7/1998 | Chang | B60B 39/006 | 280/757 |
| 6,062,348 A * | 5/2000 | Atkinson, Jr. | B60B 39/003 | 152/222 |
| 6,409,215 B1 * | 6/2002 | Holmgren | B60B 39/006 | 188/4 B |
| 6,651,783 B1 * | 11/2003 | Atkinson, Jr. | B60B 39/003 | 188/4 B |
| 6,830,134 B2 * | 12/2004 | Choi | B60B 39/006 | 152/214 |
| 7,118,130 B2 * | 10/2006 | Rosenbalm | B60B 39/003 | 280/757 |
| 7,766,387 B1 * | 8/2010 | Rosenbalm | B60B 39/003 | 152/214 |
| 9,731,553 B2 * | 8/2017 | McKenna | B60B 39/006 | |
| 2014/0338808 A1 * | 11/2014 | McKenna | B60B 39/006 | 152/214 |

\* cited by examiner

TIRE CHAINS APPARATUS

BACKGROUND OF THE INVENTION

1. Field of the Invention

This invention relates to the field of motor vehicles. More specifically, anti-skid devices and tire chain traction devices.

2. Description of Related Art

Many states require the motorist to carry and put on snow tire chains when weather conditions become icy or snowed over. In addition to hefty fines and endangering oneself and other motorists, drivers that install chains improperly or not at all, risk property damage and even death. The embodiment of this invention is to provide the vehicle operator a convenient and safe method of deploying snow tire chains in hazardous winter conditions. Millions of dollars are spent annually due to vehicle accidents wherein the motorist slid into a vehicle or another vehicle slid into the motorist. This apparatus is designed to resolve some common problems motorist are tasked with when installing standard snow tire chains. The apparatus is designed to throw chains between the tire and road surface producing significantly more traction than the standard snow tire chain. While standard snow tire chain manufacturers continue to evolve with different designs and methods to install chains, this apparatus eliminates all of the hassle and difficulty of putting on chains. This apparatus is engaged by manually lowering the apparatus handle.

Many motorists complain of having to install standard snow tire chains in poor weather conditions. The complaints range from cold numb hands to the difficulty of getting the chains installed properly. For commercial drivers, the complaint is a loss of time having to stop sometimes for thirty to forty-five minutes or more to install tire chains. Motorists complain of replacing lost chains, struggling in the dark to install chains in adverse weather conditions, chains breaking loose and wrapping around the vehicle axle and vehicle damage as a result of broken chains. This apparatus can be deployed in under two minutes. The apparatus is always with the vehicle and require no storage. This apparatus is designed to be a convenient and simple solution to manually deploying snow tire chains.

In the field of motor vehicles and transportation, there is a problem when ice and snow conditions exist that cause loss of vehicle traction and skidding of vehicles. To address this problem, traction devices have been added to vehicles that use tire chains in order to improve traction and prevent skidding. In addition to the problem of decreased vehicle traction, another problem is the lengthy amount of time for a vehicle operator to put on or to engage the vehicle traction devices. There have been many U.S. patents issued in this field to address these problems in years past. Although, there are specific problems involved in the current state of technology available to solve these problems. The most common problem with existing solutions is that they require the vehicle to have or use a pneumatic system. This invention is a non-pneumatic and non-electrical apparatus and is engaged by a manual operation of a handle. Another problem with existing solutions is that the chain wheels do not allow the tire chains to flex on harsh road conditions. This causes stress on the device and can cause the device or chain wheel to break. This invention incorporates a unique spring link or other flexible material to allow this flexibility. Provided is a list of known U.S. patents issued in this field that have attempted to address the loss of traction and loss of time for engagement of traction devices in prior years:

Ref No., Title, Publication Date, Applicant/Inventor

U.S. Pat. No. 2,277,036, Antiskid device, Mar. 24, 1942, F. P. Chaussee

U.S. Pat. No. 4,800,992, Anti-skid device, Jan. 31, 1989, Andersson et al.

U.S. Pat. No. 4,840,399, Anti-skid devices for motor vehicles, Jan. 20, 1989, Rieger et al.

U.S. Pat. No. 5,080,443, Anti-skid device, Jan. 14, 1992, Torneback

U.S. Pat. No. 5,377,735, Anti-skid device for motor vehicles, Jan. 3, 1995, Zeiser et al.

U.S. Pat. No. 6,651,783, Adjustable mounting assembly for a rapidly-deployable ice chain system for wheeled vehicles, Nov. 25, 2002, Atkinson, Jr.

U.S. Pat. No. 6,830,134, Snow chain mechanism for a vehicle, Dec. 14, 2004, Choi U.S. Pat. No. 7,118,130, Anti-skid tire chain device, Oct. 10, 2006, Rosenbalm U.S. Pat. No. 7,766,387, Anti-skid tire chain device, Aug. 3, 2010, Rosenbalm et al.

WO 2001015947A1, Adjustable mounting assembly for a rapidly-deployable ice chain system for wheeled vehicles, Mar. 8, 2001, Atikinson, Jr.

US 20140338808, Pneumatically-operated rigid linear chain and sprocket actuator for deploying a vehicle snow chain traction system, Nov. 20, 2014, McKenna et al.

BRIEF SUMMARY OF THE INVENTION

The embodiment of this invention is to provide the vehicle operator a convenient and safe method of deploying tire chains in hazardous winter conditions. Prior to this invention, vehicle operators solve this problem by manually placing standard tire chains around the tires, installing an alternative traction cover over the tires, installing a pneumatically operated chain traction system, or installation of studded tires. This apparatus is designed to resolve common chain failures. Too often the chains are not secured properly, causing the chains to come off. Improperly installed chains can cause damage to the vehicle. Drivers from time to time drive on dry roads with chains causing the vehicle to slide when braking. During cold and freezing weather conditions, a driver may elect not to put on chains because of the effort and time required to install standard snow tire chains. Standard snow tire chains can come loose and on occasion wrap around the axle. This method reduces the amount of time the vehicle operator spends outside the vehicle, reducing traffic fatalities and other safety concerns associated with the lengthy stays outside the vehicle in inclement weather. The apparatus allows the operator to manually engage or disengage tire chains in one minute or less.

There are other automatic tire chain devices, however the majority of these devices require motors or pneumatic braking systems and are cost prohibitive for most independent commercial truck operators. These motorized and pneumatic systems age and leak air, resulting in the unit not returning to a complete disengaged position. The result of this aging is dragging chains. At speed the dragging chains run over by the tire destroy the unit. Shearing off metal and resulting in the loss of the chain wheel. This apparatus is binary, engaged or disengaged, solving the issue of dragging chains. Other devices require the motorist to be in motion when attempting to deploy the automatic chain system. This apparatus can be engaged when a vehicle is motionless or stuck providing instant traction. This apparatus is designed for quick engagement and similarly quick disengagement on any vehicle. This invention provides the motorist a simple, reliable, convenient, cost-effective method of deploying tire chains on hazardous streets and highways without exposing themselves for prolonged periods of time to weather and risk of accidents. The apparatus eliminates all of the hassle and difficulty associated with putting on standard snow tire chains. The motorist manually lowers and locks the apparatus handle to engage the tire chains. Contrastingly, the motorist unlocks and raises the handle to disengage the tire chains.

In one embodiment, the apparatus handle in a manually lowered lock position, including a plurality of levers and springs, locks the chain wheel to the inside wall of the vehicle tire. When the vehicle is in motion the chain wheel engaged with the inside surface of tire wall will rotate, throwing sections of chain under the tire.

In another embodiment, the apparatus handle in a manually raised unlock position, including a plurality of levers and springs, unlocks the chain wheel disengaging from the inside wall of the vehicle tire. When the vehicle is in motion the chain wheel disengages and releases chain sections allowing a plurality of springs and levers to lift up the chain wheel to an unlocked disengaged position.

The foregoing and other features of the invention are hereinafter described in greater detail with reference to the accompanying drawings.

| REFERENCE NUMERALS IN THE DRAWINGS | | | |
|---|---|---|---|
| 28 | apparatus disengaged | 29 | tire |
| 30 | u bolts | 31 | axle |
| 32 | base plate | 33 | vertical lock |
| 34 | lift spring | 35 | chains |
| 36 | impact spring | 37 | chain wheel |
| 38 | handle | 39 | arm |
| 40 | apparatus engaged | 41 | bearing |
| 42 | chain fastener | 43 | anti-tangle ring |
| 44 | chain separator | 45 | chain separator |
| 46 | ring to base connect | 47 | ring to separator connect |
| 48 | ring fastener | 49 | bi-directional joint |
| 50 | lock release | 51 | travel restrictor |
| 52 | bi-directional stop | 53 | u bolt slot |
| 54 | bi-directional axis | 55 | lower contact joint |
| 56 | arm lock | 57 | horizontal lock |

DETAILED DESCRIPTION OF THE INVENTION

Figure 1:
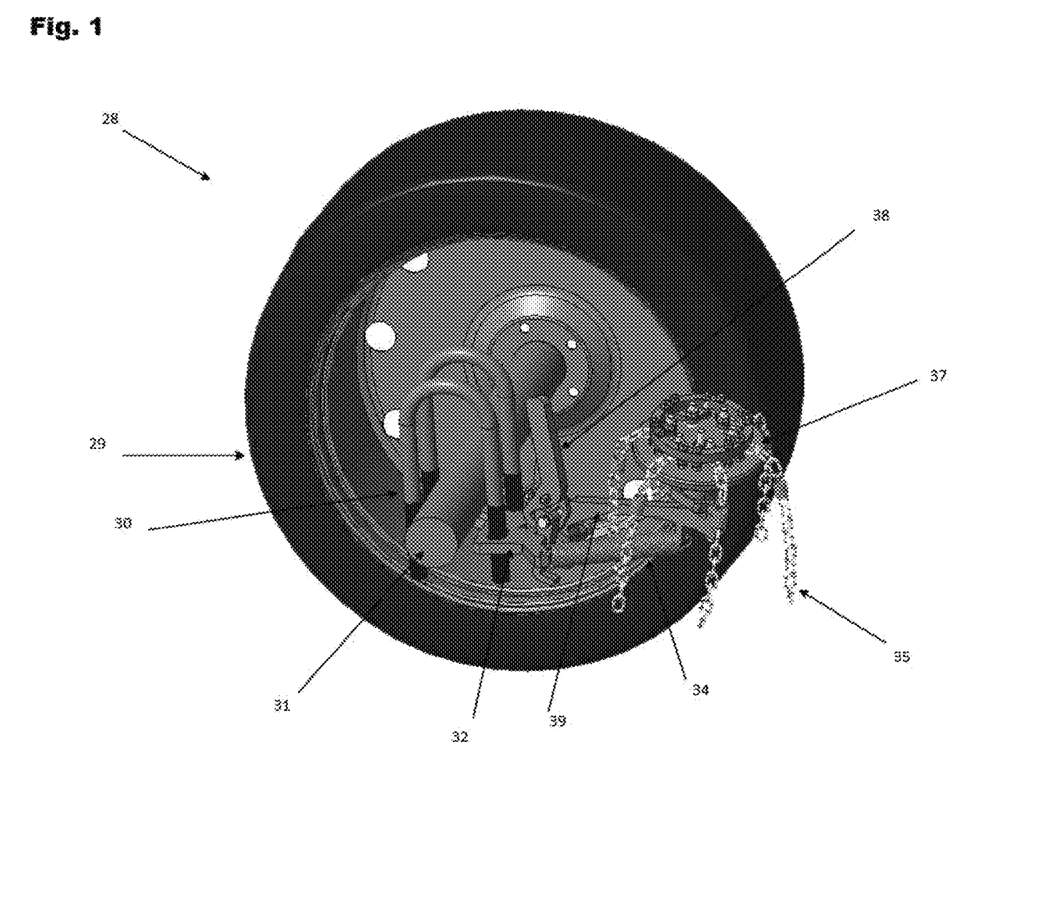
FIG. 1 depicts a side view embodiment of this invention configured in a disengaged, "chain off" mode. The side perspective view showing the apparatus attached to the vehicle axle.

Referring to the Figures, wherein like numerals indicate like or corresponding parts throughout the several views, FIG. 1 depicts a side view embodiment of this apparatus generally shown at 28, configured in a disengaged, "chain off" mode. The side perspective view showing a tire 29 and axle 31 with the apparatus mounted to the driver side rear axle 31 wheel. Disengaged or "chain off" mode 28 is described when the apparatus is in the up position and the chain wheel 37 is not in contact with the tire 29 sidewall preventing chains 35 from spinning and contacting road surface. The apparatus base plate 32 provides a channel guide permitting the apparatus handle 38 to be locked in "chain off" mode 28. The adjustable apparatus base plate 32 is connected to the vehicle axle 31 axle u bolts 30. Unlocking and raising the apparatus handle 38 releases the lift spring 34 allowing the chain wheel 37 to lift up and disengage from the tire 29 sidewall. In the "chain off" mode 28, the lift spring 34 connected to the base plate 32 and arm 39 is contracted. The initial lift spring 34 tension load is sufficient to hold the chain wheel 37 in an upward "chain off" mode 28 position.

Figure 2:
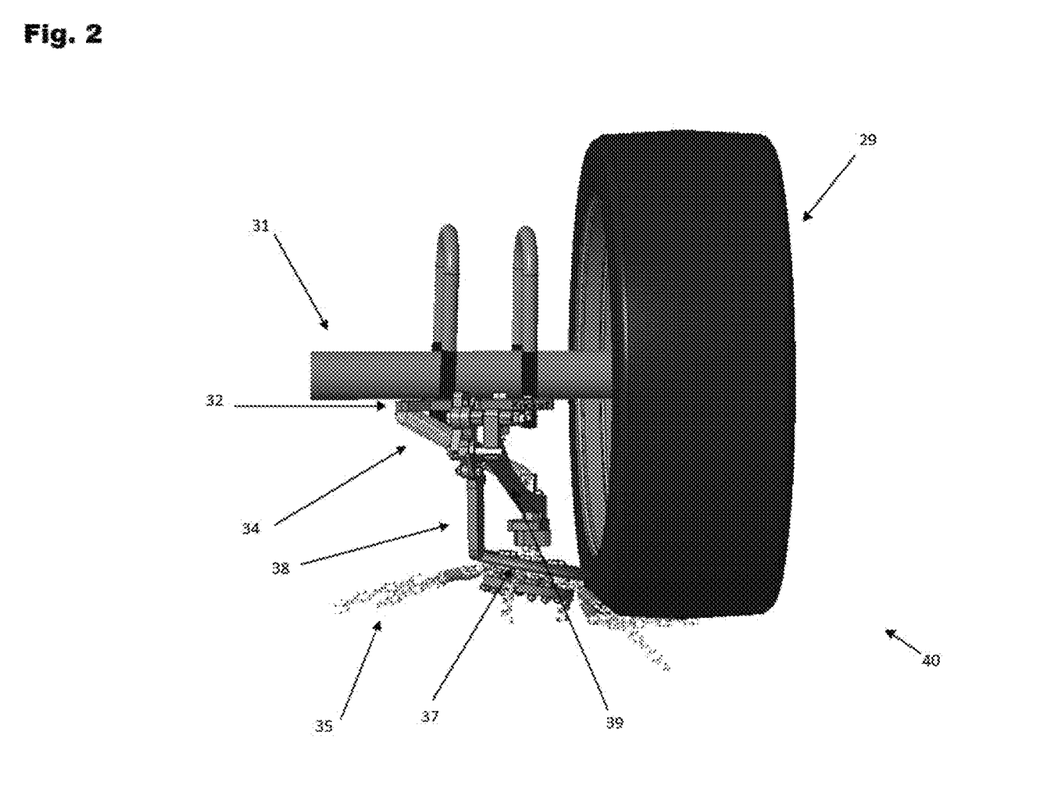
FIG. 2 depicts a front view embodiment of this invention configured in an engaged, "chain on" mode. The front perspective view showing the apparatus attached to the vehicle axle.

As shown in FIG. 2 a front view embodiment of this invention configured in an apparatus engaged, "chain on" mode is generally shown at 40. The front perspective view showing a tire 29 and axle 31 with the apparatus mounted to the driver side rear axle 31 wheel. Engaged or "chain on" mode 40 is described when the apparatus is in the down position and the chain wheel 37 is in contact with the tire 29 sidewall allowing chains 35 to spin and contact road surface beneath the tire 29. "Chain on" engages the chain wheel 37 to the tire 29 sidewall causing the chain wheel 37 to rotate throwing a plurality of chains 35 under the tire 29 providing vehicle traction. The apparatus base plate 32 provides a channel guide permitting the handle 38 to be locked in "chain on" mode 40. In the "chain on" mode 40, the lift spring 34 connected to the base plate 32 and arm 39 is fully extended creating tension. This tension load is static until the handle 38 is released.

Figure 3:
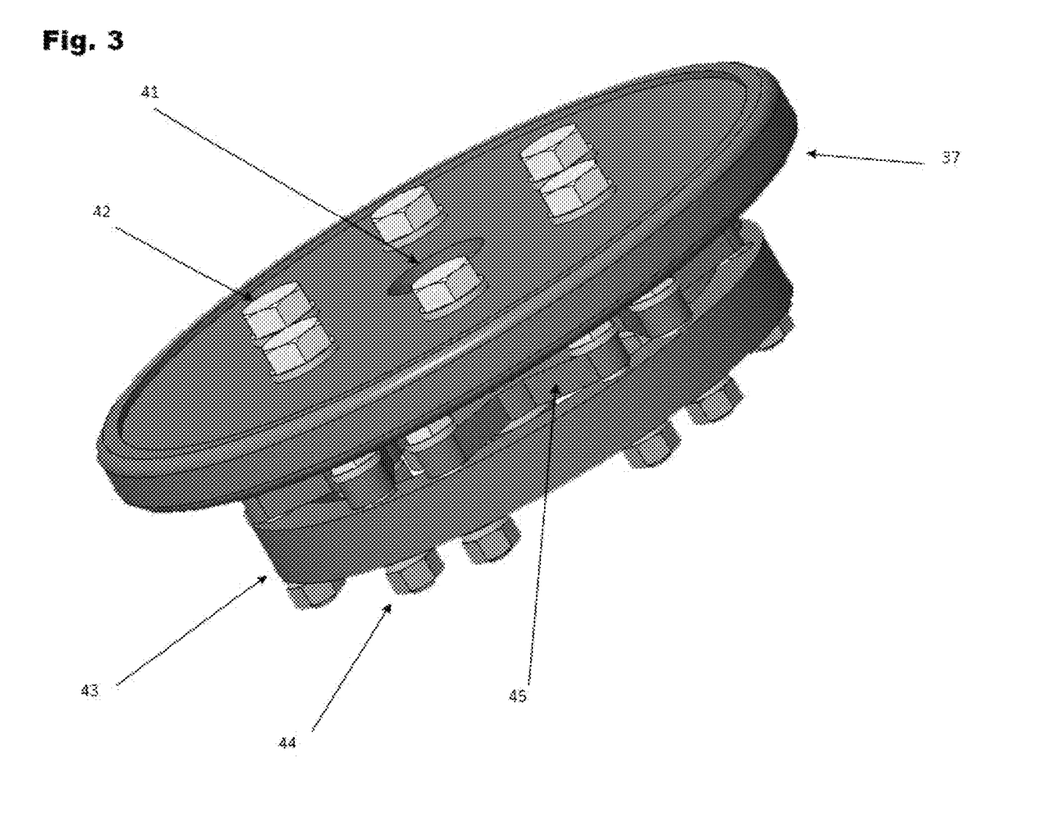
FIG. 3 depicts a side view of the chain wheel. The side perspective view showing the chain wheel assembly detached from the apparatus.

As shown in FIG. 3 a side view perspective showing a chain wheel 37. The movable part chain wheel 37 rotates counterclockwise when in contact with the sidewall of the tire throwing a plurality of chains between the tire and road surface generating traction. The moveable part chain wheel 37 rotates on an axis forward or reverse facilitated by a sealed weather resistant bearing 41. The movable part chain wheel 37 is fastened to the chain separator 45 with six chain fastener 42 bolts. The anti-tangle ring 43 is fastened to chain separator 45 with twelve separator fastener 44 bolts. This novel chain wheel 37 and chain separator 45 in conjunction with the anti-tangle ring 43 design induces quick chain deployment with unsubstantial chain tangle.

Figure 4:
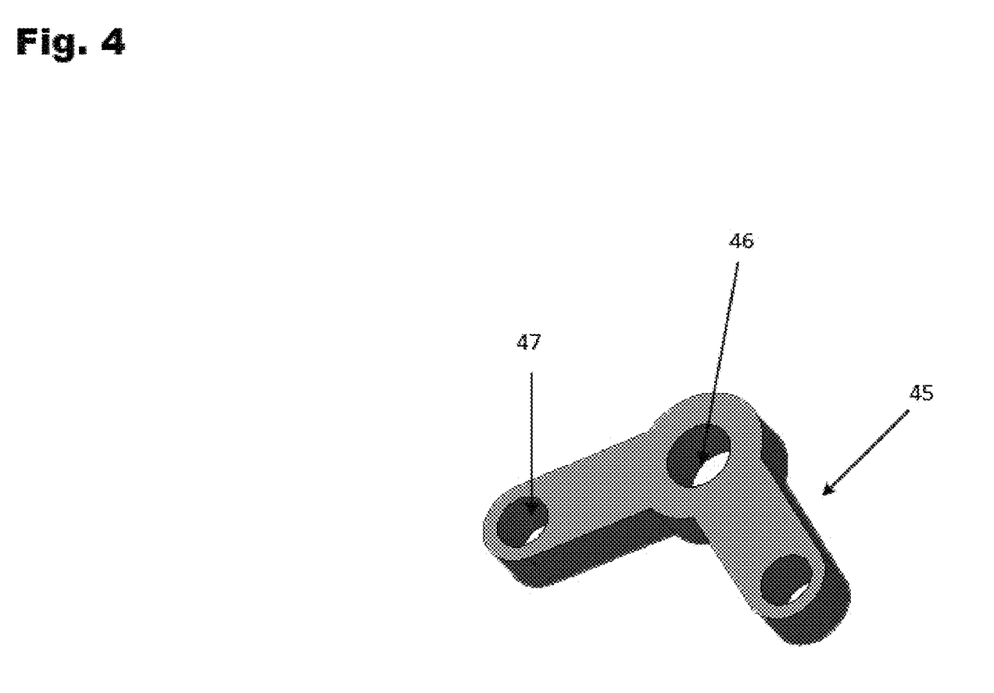
FIG. 4 depicts a top view of anti-tangle chain separator. The detail view showing the of anti-tangle chain separator detached from the chain wheel.

As shown in FIG. 4 a top view detail showing the chain separator 45. The chain separator 45 is fastened to the chain wheel with six chain fastener bolts thru the separator wheel connect 46 hole. Holes are separated equally at sixty degrees. The chain separator 45 is also fastened to the anti-tangle ring with twelve separator fastener bolts thru the separator ring connect 47 hole. The chain separator 45 restricts chain movement to specific paths minimizing chain tangle when the vehicle is in motion at low speeds, forward or reverse drive.

Figure 5:
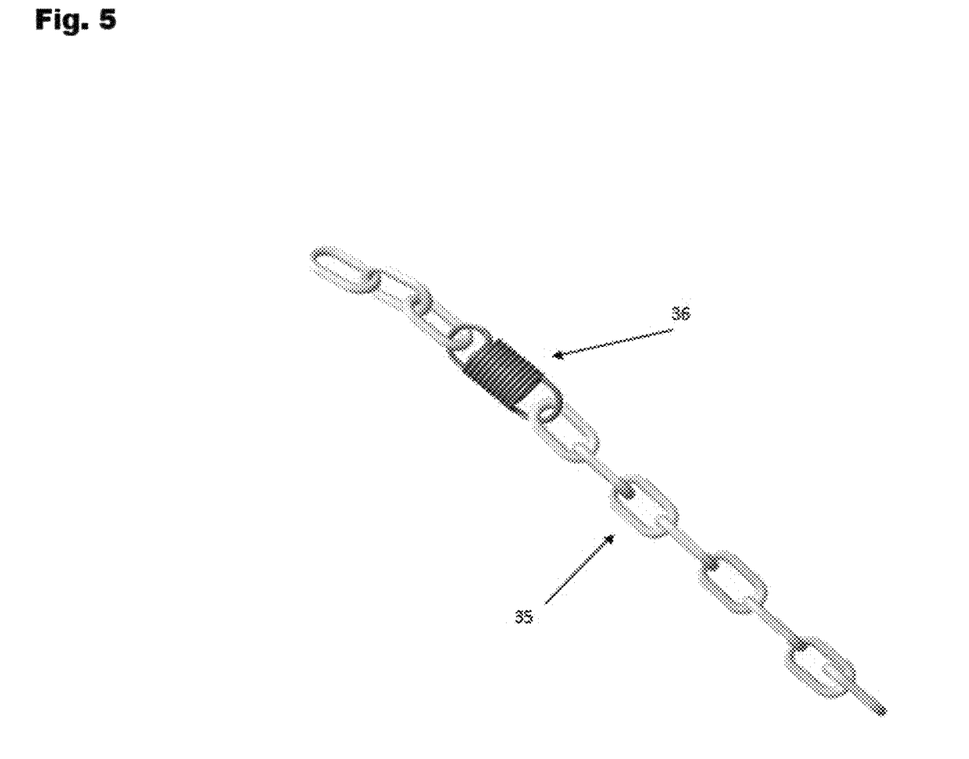
FIG. 5 depicts a side view of impact reduction chain assembly. The side detail view showing the impact reduction chain assembly detached from the chain wheel.

As shown in FIG. 5 a side detail view perspective showing the chain 35 and impact spring 36. The chain 35 and impact spring 36 absorb shock and impact of the vehicle tire rolling over bumps and potholes. The impact spring 36 flexes when the chain 35 is under the vehicle tire and a force multiplier is encountered. The impact resistant chain design substantially reduces the force returned to the chain wheel apparatus. The force reduction of the impact spring 36 is critical to the chain apparatus impact survival.

Figure 6:
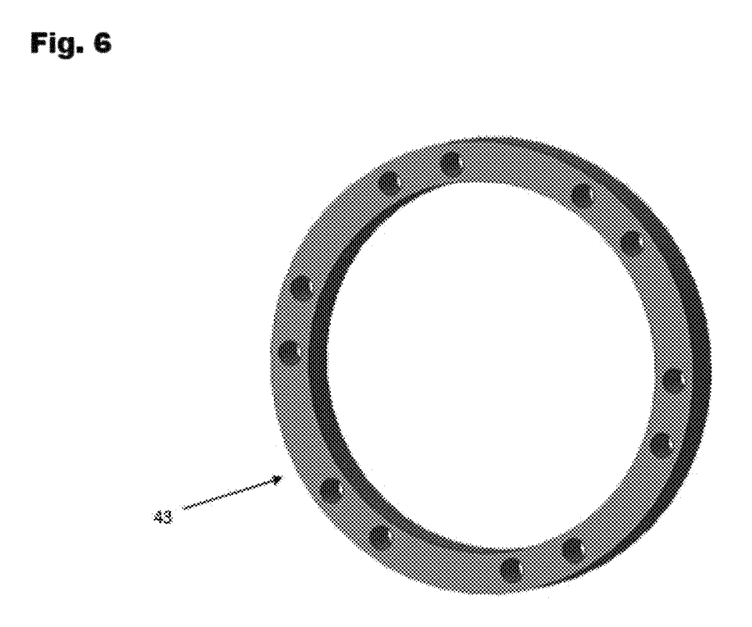
FIG. 6 depicts a top detail view of the wheel ring. The top detail view of the ring wheel showing the ring wheel assembly detached from the chain wheel.

As shown in FIG. 6 a top detail view perspective showing the anti-tangle ring 43. The anti-tangle ring 43 restricts chain from winding together at low speeds. The antitangle ring 43 in conjunction with chain separator design induce quick chain deployment with unsubstantial chain tangle. The anti-tangle ring 43 creates a channel between the chain wheel and anti-tangle ring 43 allowing the chains to systematically wrap at low speed and subsequently unwrap at higher rotations with little or no chain tangle.

Figure 7:
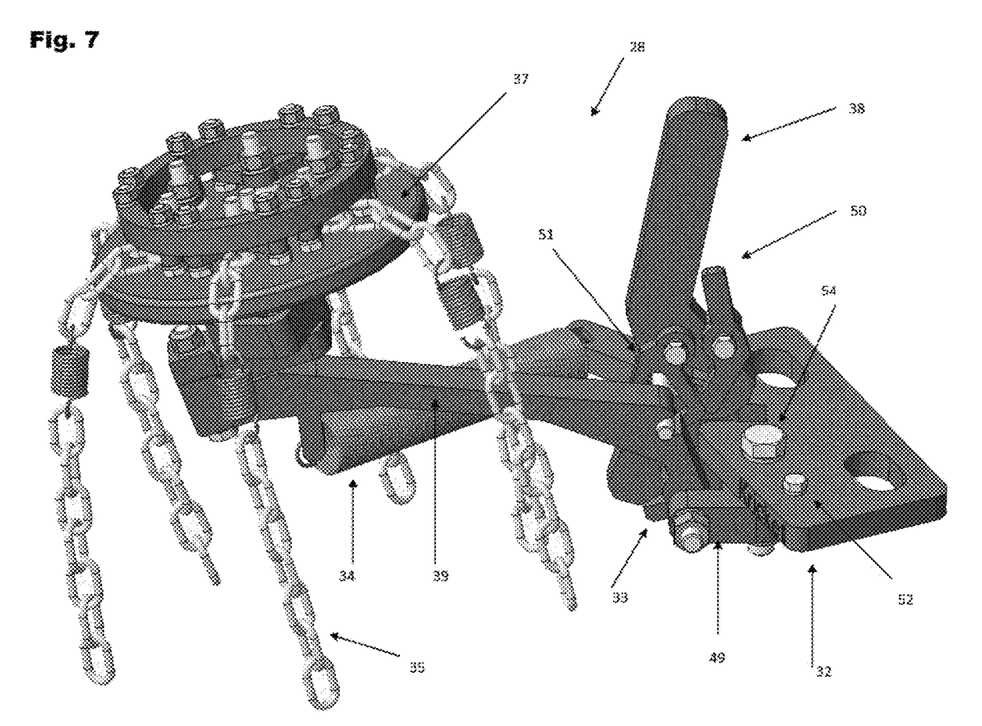
FIG. 7 depicts a side view embodiment of this invention configured in a disengaged, "chain off" mode. The side perspective view showing the apparatus detached from the vehicle axle.

As shown in FIG. 7 a side view embodiment of this invention generally shown at 28. The side view embodiment showing the apparatus 28 detached from the vehicle axle. The movable part arm 39 is raised and lowered in conjunction with raising and lowering moveable part apparatus handle 38. The bi-directional joint 49 is home at rest when the apparatus 28 is in disengaged, "chain off" mode. The lift spring 34 returns to a load-free contracted position when unlocked. The lift spring 34 connected to the base plate 32 and the arm 39. The lift spring 34 is calibrated to lift and hold the combined weight of the chain wheel 37 and a plurality of chains. The chain wheel 37 and a plurality of chains 35 are lifted and rotated away from tire sidewall. The apparatus arm 39 is fastened by a bolt to the bi-directional joint 49. The movable part bi-directional joint 49 is fastened to the base plate 32 bi-directional axis 54 bolt facilitating the moveable part arm 39 to rotate vertically and horizontally. Vertical movement is managed by the travel restrictor 51. Horizontal movement is managed by the bi-directional stop 52. Vertical and horizontal movement of the movable part apparatus handle 38 is managed to simplify engaging and disengaging the apparatus. The lock release 50 maintains the correct spacing between vertical lock 33 and top of the base plate 32 to simplify engaging and disengaging the apparatus. In the "chain off" mode there is no contact between the chain wheel 37 and tire sidewall resulting in no traction being generated by the chain wheel 37.

Figure 8:
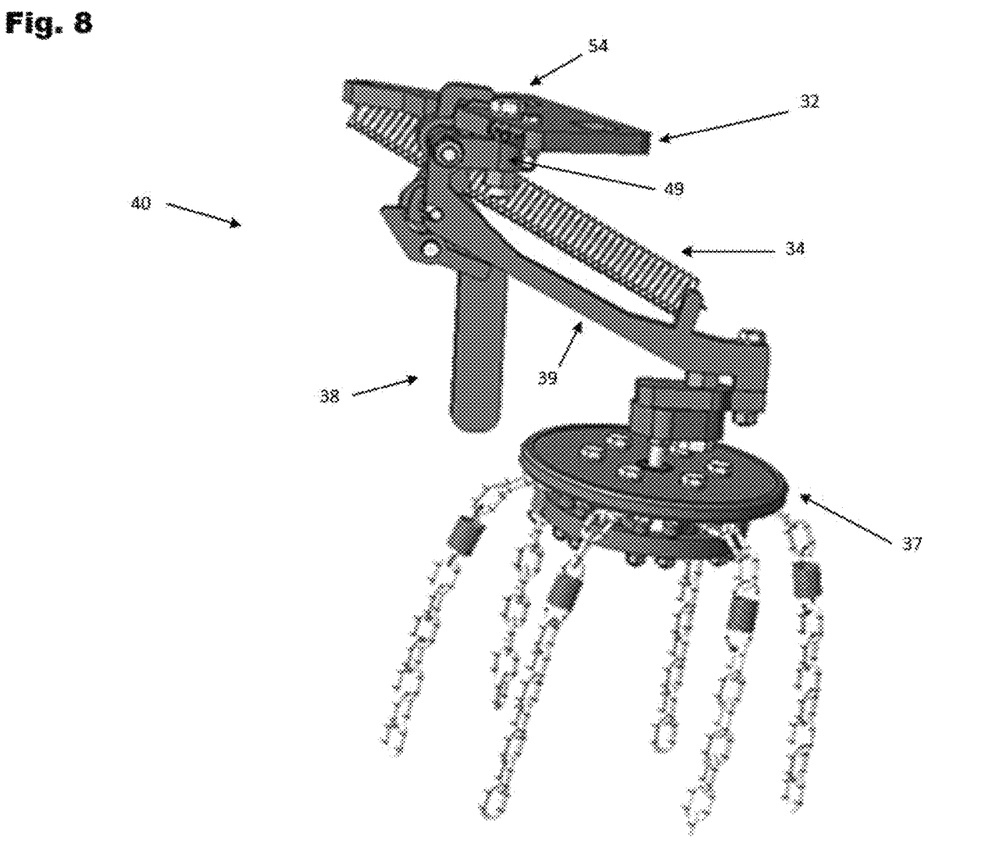
FIG. 8 depicts a side view embodiment of this invention configured in an engaged, "chain on" mode. The side perspective view showing the apparatus detached from the vehicle axle.

As shown in FIG. 8 a side view embodiment of this invention generally shown at 40. The side view embodiment showing the apparatus 40 detached from the vehicle axle. The movable part arm 39 is raised and lowered in conjunction with raising and lowering moveable part apparatus handle 38. The movable part arm 39 is lowered when the apparatus 40 is in engaged, "chain on" mode. The lift spring 34 is extended to a load position when locked. The lift spring 34 connected to the base plate 32 and the arm 39. The lift spring 34 is calibrated to lift the combined weight of the chain wheel 37 and a plurality of chains when the movable part apparatus handle 38 is released. The chain wheel 37 is lowered and locked in contact with the tire sidewall in the "chain on" mode. The apparatus arm 39 is fastened by a bolt to the bi-directional joint 49. The movable part bi-directional joint 49 is fastened to the base plate 32 bi-directional axis 54 bolt facilitating the moveable part arm 39 to rotate vertically and horizontally. In the "chain on" mode contact between the chain wheel 37, and tire sidewall generates chain wheel 37 rotation throwing a plurality of chains between the tire and road surface creating instant traction.

Figure 9:
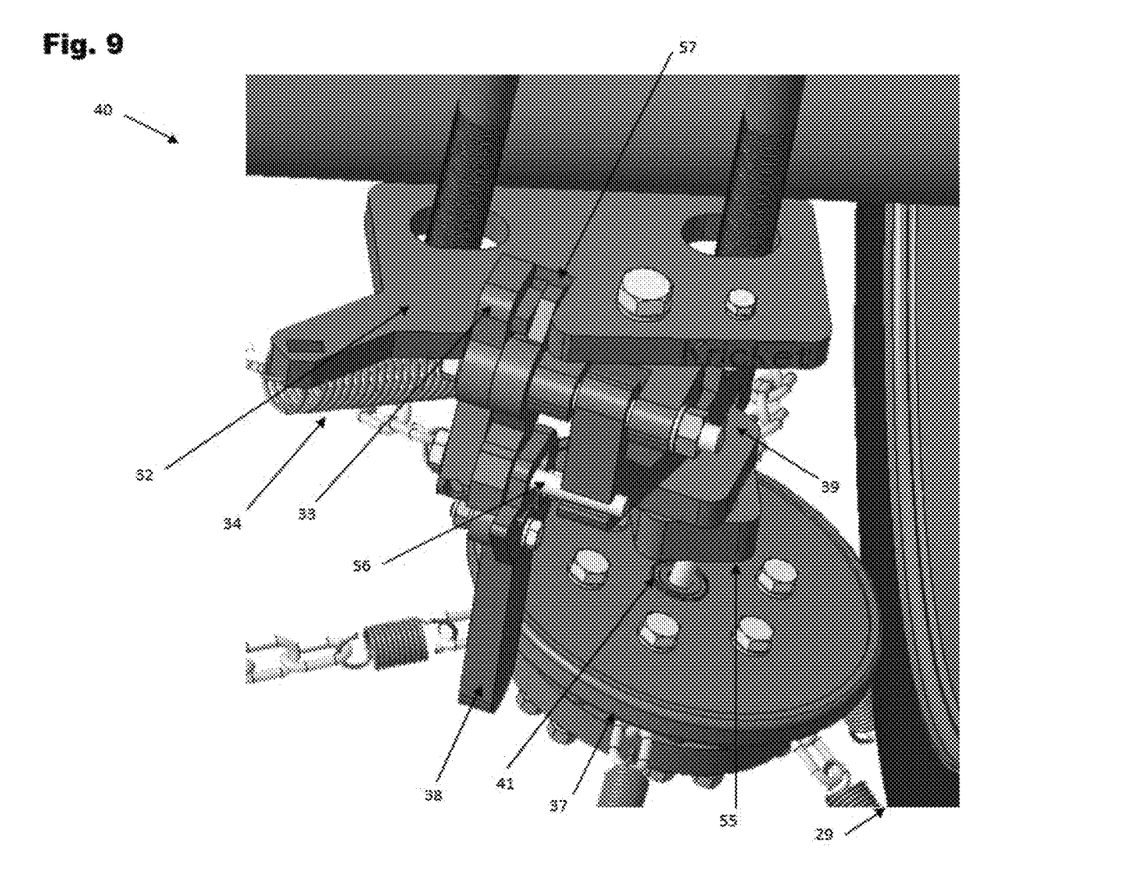
FIG. 9 depicts a top view embodiment of this invention configured in an engaged, "chain on" mode. The top perspective view showing the apparatus base plate and locking strategy.

As shown in FIG. 9 a top view embodiment of this invention generally shown at 40. The top view embodiment showing the apparatus 40 attached to the vehicle axle. The movable part vertical lock 33 is positioned atop the base plate 32 in conjunction with lowering moveable part handle 38. In this apparatus engaged, "chain on" mode the vertical lock 33 restricts any vertical movement locking the chain wheel 37 in a lowered position. The movable part horizontal lock 57 is keyed and positioned through the base plate 32 in conjunction with lowering moveable part handle 38. In this apparatus engaged, "chain on" mode the horizontal lock 57 restricts any horizontal movement locking the chain wheel 37 in a lowered position against the tire sidewall. The movable part handle 38 in this lowered position forces the arm lock 56 to engage the arm 39 firmly fixing the chain wheel 37 against the tire sidewall. The arm lock 56 is fastened to the movable part vertical lock 33. The movable part vertical lock 33 fixed atop base plate 32 restricts the vertical movement of the arm lock 56 resulting in a locked down arm 39. To ensure constant contact between the chain wheel 37 and tire 29 sidewall the lower contact joint 55 is spring loaded forcing chain wheel 37 against the tire 29 creating the friction required to rotate the chain wheel 37. Once the apparatus is in the locked position the chain wheel 37 will rotate freely on a weather sealed bearing 41. To release the lock the operator need only to lift the movable part handle 38 pull horizontally disengaging the vertical lock 33 from atop the base plate 32. This motion allows vertical movement of moveable part vertical lock 33 subsequently releasing the arm lock 56 freeing the arm 39. Once the moveable part arm 39 is free the lift spring 34 will raise the chain wheel 37 to a disengaged non-operable position.

Having described the invention, we claim:

1. A snow chain apparatus to be mounted on a vehicle axle, comprising:
  a base plate for mounting to or near a vehicle axle;
  a chain wheel having a plurality of chains to selectively position under a tire of the vehicle axle when in use, and to store away from the tire when not in use;
  a pivot arm connecting the chain wheel to the base plate;
  a lift spring operable in conjunction with the pivot arm between a contracted position in a chain-off mode, and an extended position in a chain-on mode;
  a handle to move the pivot arm between the chain-off mode and the chain-on mode; and
  a movable part vertical lock positioned atop the base plate in conjunction with lowering the handle, wherein the vertical lock restricts any vertical movement locking the chain wheel in a lowered position.

2. The apparatus of claim 1, further comprising a movable part horizontal lock keyed and positioned through the base plate in conjunction with lowering the handle in the chain-on mode, the horizontal lock restricting horizontal movement of the handle and locking the chain wheel in a lowered position against the tire sidewall.

3. The apparatus of claim 2, wherein the handle in the lowered position forces an arm lock to engage the pivot arm and firmly fix the chain wheel against the tire sidewall.

4. The apparatus of claim 3, wherein the arm lock is fastened to the movable part vertical lock, the movable part vertical lock restricting the vertical movement of the arm lock resulting in a locked down pivot arm.

5. The apparatus of claim 4, wherein in a locked position the chain wheel rotates freely on a weather sealed bearing.

6. The apparatus of claim 5, wherein the handle pulls horizontally to disengage the vertical lock from atop the base plate, so that vertical movement of moveable part vertical lock subsequently releases the arm lock and frees the pivot arm; and wherein after the moveable part arm is free, the lift spring raises the chain wheel to a disengaged and non-operable position.

7. A snow chain apparatus to be mounted on a vehicle axle, comprising;
   a base plate for mounting to or near a vehicle axle;
   a chain wheel having a plurality of chains to selectively position under a tire of the vehicle axle when in use, and to store away from the tire when not in use;
   a pivot arm connecting the chain wheel to the base plate;
   a lift spring operable in conjunction with the pivot arm between a contracted position in a chain-off mode, and an extended position in a chain-on mode;
   a handle to move the pivot arm between the chain-off mode and the chain-on mode; and
   a lock release to maintain spacing between a vertical lock and a top of the base plate to simplify engaging and disengaging the chain wheel.

\* \* \* \* \*